Patented Dec. 20, 1949

2,492,048

UNITED STATES PATENT OFFICE 2,492,048

STABILIZATION OF TRICHLOROETHYLENE AND TETRACHLOROETHYLENE

Walter Klabunde, Niagara Falls, N. Y., assignor to E. I. du Pont de Nemours & Company, Wilmington, Del., a corporation of Delaware No Drawing. Application August 24, 1945, Serial No. 612,549

7 Claims. (Cl. 260—652.5)

This invention relates to the prevention of decomposition of halogenated hydrocarbon solvents particularly trichlorethylene and perchlorethylene. It is known that these materials when exposed to air, light and heat decompose by oxidation with the formation of substances with objectionable characteristics, usually acidic substances, which render the solvent unsuitable for such purpose as metal vapor degreasing, dry cleaning and oil extracting. It is also known that when trichlorethylene is exposed to excessive heat, it decomposes by a condensation type reaction to form hydrochloric acid together with a resinous material. In the presence of iron or aluminum, hydrochloric acid thus formed reacts with these metals to form the chloride salts which act as catalysts of trichlorethylene decomposition by the condensation reaction. Thus when this condensation reaction takes place in metal vapor degreasing where the chips of these metals are in contact with boiling trichlorethylene, it often becomes autocatalytic. When this occurs, the solvent decomposes very vigorously with the evolution of large quantities of hydrochloric acid and the formation of a tarry or gummy mass in the solvent.

As the major applications of the chlorohydrocarbon solvents are cyclic processes in which the solvent is recovered by distillation, the solvent should be protected with an inhibitor which is recovered with the solvent on distillation. For this same reason, the inhibitor used should not react with free fatty acids, a common contaminant in solvent applications. For example, in metal vapor degreasing buffing compounds and drawing oils are sources of fatty acid. Buffing compounds generally contain about 50% stearic acid while drawing oils contain as much as 5 or 10% oleic acid.

An object of this invention is to provide a stabilizer for chlorohydrocarbons, such as trichlorethylene and perchlorethylene which will inhibit the normal oxidation decomposition reactions. Another object of this invention is to provide a stabilizer for trichlorethylene which will inhibit the condensation type decomposition reaction which is catalyzed by the presence of iron or aluminum. Still another object of this invention is to provide a stabilizer for trichlorethylene or perchlorethylene which can be readily recovered with the solvent and which need only be present in relatively small concentrations usually a small fraction of one per cent.

These and other objects hereinafter apparent can be accomplished by dissolving in the chlorohydrocarbon solvents neutral or weakly acidic compounds which are antioxidants as well as condensation inhibitors.

I have discovered that pyrrole, N-alkyl pyrroles and their alkyl and halogen derivatives are weakly acidic or neutral compounds which are effective both as antioxidants and as inhibitors of the above mentioned condensation reactions when added to the chlorohydrocarbon solvents. The general formula for such pyrrols is:

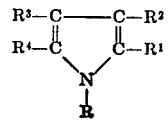

where R represents hydrogen or alkyl group and $R^1$, $R^2$, $R^3$, and $R^4$ represent hydrogen, halogen or alkyl groups. The nature and amount of the substituent groups in the above formula will depend largely on the chlorohydrocarbon to be stabilized and the purpose for which the stabilized chlorohydrocarbon is intended to be used. For example, when trichlorethylene to be used in processes such as degreasing and solvent extraction where solvent recovery is practiced, the pyrrole stabilizer should have a boiling point within the range of about 80° to 135° C. For stabilizing perchlorethylene used for similar processes, the boiling point of the pyrrole can be as high as around 180° C. For other purposes, such as mere storage, the boiling point is relatively unimportant.

While I generally prefer to utilize pyrroles having the above structural formula in which the various alkyl groups contain not more than 4 carbon atoms, still higher molecular weight alkylated pyrroles and hydropyrroles may be used, so long as they are soluble in the chlorohydrocarbon to be stabilized. Likewise, I generally prefer to utilize chlorine and fluorine as the halogen substituents, but the other halogens (bromine and iodine) also can be used.

Following are examples of pyrroles suitable as stabilizers according to the present invention: pyrrole, N-methyl pyrrole, N-ethyl pyrrole, 2-methyl pyrrole, 3-methyl pyrrole, 2,4-dimethyl pyrrole, 2,5-dimethyl pyrrole, N-propyl pyrrole and 2-chloropyrrole.

Pyrrole and N-alkyl pyrroles, especially those in which the alkyl group contains 1 to 4 carbon atoms, are the preferred stabilizers for the practice of this invention.

Although the application of the pyrroles as stabilizers is most useful with trichlorethylene and perchlorethylene where they inhibit all the ordinary decomposition reactions, the invention is not limited to these solvents alone. The addition of the pyrrole compounds will inhibit the oxidation of other chlorohydrocarbons which are liquids at room temperature, for example, methylene chloride, chloroform, carbon tetrachloride, ethylene dichloride, trichlorethane, tetrachlorethane and pentachlorethane, vinylidene chloride, 1,2-dichlorethylene and vinyl chloride, butyl chloride and 1,2-dichloropropane.

In general, the proportion of pyrrole compounds added to the chlorohydrocarbon may be anywhere from 0.01% to 0.1% by weight. However, I have found that concentrations of pyrrole and N-methyl pyrrole as low as 0.001% by weight are still very effective in inhibiting decomposition. On the other hand, solvent which is continuously exposed to severe conditions will benefit by use of larger quantities of stabilizer, e. g., 0.5% or even 1% by weight. The pyrroles are soluble in the chlorohydrocarbons within the above stated concentration range.

The following examples show the results obtained with the stabilizers of my invention.

*Example 1*

The following test was made to determine the inhibiting effect of pyrroles on the condensation reactions of trichlorethylene catalyzed by iron and aluminum. Separate portions of trichlorethylene were stored in the absence of air in closed glass containers under identical storage time and conditions. Certain portions, as shown by the following table contained 0.04 g. per 100 cc. of hydrogen reduced iron powder (about 200 mesh size) and 0.2 g. per 100 cc. of 40 mesh size aluminum powder, respectively, with and without the addition of 0.1% by weight of a pyrrole and one portion consisted of the trichlorethylene alone. Other portions consisted of trichlorethylene and 0.1% by weight of a pyrrole. At the end of the storage period, the samples were analyzed for chloride ion thereby to determine the degree of decomposition which occurred.

| Trichlorethylene Portion | Substances Added | Chloride Content (Mg./100 cc.) |
|---|---|---|
| 1 | None | 4 |
| 2 | Iron | 1000 |
| 3 | Aluminum | 600 |
| 4 | Iron and pyrrole | 72 |
| 5 | Aluminum and pyrrole | 11 |
| 6 | Pyrrole | 3.2 |
| 7 | Iron and N-methyl pyrrole | 75 |
| 8 | Aluminum and N-methyl pyrrole | 3.5 |
| 9 | N-methyl pyrrole | 6 |
| 10 | Iron and N-ethyl pyrrole | 44 |
| 11 | Aluminum and N-ethyl pyrrole | 6.6 |
| 12 | N-ethyl pyrrole | None |

*Example 2*

The addition of pyrrole or pyrrole derivatives to trichlorethylene and perchlorethylene were evaluated as anti-oxidant by refluxing the chlorohydrocarbon four hours in the presence of oxygen and light from a mercury vapor lamp, while the condensate is passed through a water layer before returning it to the boil. The amount of decomposition was measured by the total acidity formed in the chlorohydrocarbon and in the water layer. The following table shows the results obtained with various additions:

| Chlorohydrocarbon | Stabilizer | Mols acids formed |
|---|---|---|
| trichlorethylene | none | 0.020 |
| Do | 0.1% pyrrole | 0.00017 |
| Do | 0.005% pyrrole | 0.00017 |
| Do | 0.1% N-methyl pyrrole | 0.00009 |
| Do | 0.001% N-methyl pyrrole | 0.00013 |
| Do | 0.1% N-ethyl pyrrole | 0.00008 |
| perchlorethylene | none | 0.0050 |
| Do | 0.1% N-methyl pyrrole | 0.00009 |
| Do | 0.01% N-methyl pyrrole | 0.00013 |

I claim:

1. A new composition of matter comprising a liquid chlorohydrocarbon selected from the group consisting of trichlorethylene and perchlorethylene which contains a stabilizing amount of a pyrrole having the formula:

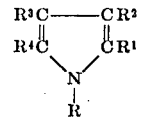

where R represents a radical selected from the group consisting of hydrogen and alkyl and $R^1$, $R^2$, $R^3$, and $R^4$ represent a radical selected from the group consisting of hydrogen, alkyl and halogen.

2. A new composition of matter comprising a liquid chlorohydrocarbon selected from the group consisting of trichlorethylene and perchlorethylene which contains 0.001 to 1% by weight of an N-alkyl pyrrole in which the alkyl group contains 1 to 4 carbon atoms.

3. A new composition of matter comprising trichlorethylene which contains 0.001 to 1% by weight of an N-alkyl pyrrole.

4. A new composition of matter comprising trichlorethylene which contains 0.001 to 1% by weight of N-methyl pyrrole.

5. A new composition of matter comprising trichlorethylene which contains 0.001 to 1% by weight of pyrrole.

6. A new composition of matter comprising perchlorethylene which contains 0.001 to 1% by weight of an N-alkyl pyrrole.

7. A new composition of matter comprising perchlorethylene which contains 0.001 to 1% by weight of N-methyl pyrrole.

WALTER KLABUNDE.

REFERENCES CITED

The following references are of record in the file of this patent:

FOREIGN PATENTS

| Number | Country | Date |
|---|---|---|
| 502,838 | Great Britain | Mar. 27, 1939 |

OTHER REFERENCES

Sidgwick et al., "Organic Chemistry of Nitrogen," page 474 (1942).

Disclaimer 2,492,048.—*Walter Klabunde*, Niagara Falls, N. Y. STABILIZATION OF TRICHLORO-
ETHYLENE AND TETRACHLOROETHYLENE. Patent dated Dec. 20, 1949.
Disclaimer filed Aug. 11, 1950, by the assignee, *E. I. du Pont de Nemours and Company*.

Hereby enters this disclaimer to claims 1 and 5 of said patent.
[*Official Gazette September 12, 1950*.]